US008140240B2

(12) United States Patent
Molen et al.

(10) Patent No.: US 8,140,240 B2
(45) Date of Patent: Mar. 20, 2012

(54) ENGINE SPEED CONTROLLER WITH TOTAL SYSTEM INTEGRATION FOR ON-BOARD VEHICLE POWER APPLICATIONS

(75) Inventors: G. Marshall Molen, Starkville, MS (US); Angela E. Card, Starkville, MS (US)

(73) Assignee: Mississippi State University, Mississippi State, MS (US)

( * ) Notice: Subject to any disclaimer, the term of this patent is extended or adjusted under 35 U.S.C. 154(b) by 750 days.

(21) Appl. No.: 12/077,084

(22) Filed: Mar. 14, 2008

(65) Prior Publication Data

US 2008/0309094 A1 Dec. 18, 2008

Related U.S. Application Data

(60) Provisional application No. 60/919,321, filed on Mar. 21, 2007.

(51) Int. Cl.
*B60T 8/32* (2006.01)
*F02D 11/10* (2006.01)

(52) U.S. Cl. ........................................ 701/93; 123/399

(58) Field of Classification Search .................... 701/93; 123/352, 355, 354, 361, 399, 25 R, 25 A, 123/25 J, 25 K, 25 M, 25 N, 25 Q
See application file for complete search history.

(56) References Cited

U.S. PATENT DOCUMENTS

| | | | | |
|---|---|---|---|---|
| 4,592,323 | A * | 6/1986 | Vest | 123/362 |
| 4,616,166 | A * | 10/1986 | Cooper et al. | 318/712 |
| 5,411,002 | A * | 5/1995 | Smitley | 123/497 |
| 6,698,387 | B1 * | 3/2004 | McFarland et al. | 123/25 A |
| 7,082,924 | B1 * | 8/2006 | Ruedin | 123/352 |

* cited by examiner

*Primary Examiner* — James Trammell
*Assistant Examiner* — Muhammad Shafi
(74) *Attorney, Agent, or Firm* — Lawrence Arthur Schemmel

(57) ABSTRACT

The present invention provides a system and method for controlling the speed of a vehicle engine utilizing total system integration and an on-board power system for electrical power generation and distribution, which ensure that control of multiple components can be maintained, that critical operational parameters can be modified by generating calibration values, and that an electrical load can be met in both stationary and mobile vehicle applications.

13 Claims, 7 Drawing Sheets

ENGINE SPEED CONTROLLER WITH TOTAL SYSTEM INTEGRATION FOR ON-BOARD VEHICLE POWER APPLICATIONS

CROSS-REFERENCE TO RELATED APPLICATION

This application claims priority from U.S. Provisional Patent Application Ser. No. 60/919,321 filed Mar. 21, 2007. The entirety of that provisional application is incorporated herein by reference.

STATEMENT OF GOVERNMENT SUPPORT

This invention was made with government support under grant DASG60-00-C-0074 awarded by the U.S. Army Space and Missile Defense Command. The government may have certain rights in this invention.

FIELD OF THE INVENTION

This invention relates to a system and method for providing total system integration for an on-board vehicle power system. This type of vehicle power system is utilized in situations in which a vehicle is used for electrical power generation and distribution wherein all elements and components (including, but not limited to, the generator and power electronics, if necessary) are contained within the vehicle to provide power to meet an electrical load. This invention ensures that the electrical load for an on-board vehicle power system can be met by taking appropriate action(s) depending upon stationary or mobile vehicle applications. It also allows for total system integration of an on-board vehicle power system, so that control of the various components can be maintained. This invention further provides calibration values that allow certain parameters to be easily changed or modified, or even enabled or disabled, resulting in a system that is extremely adaptable to different types of vehicles, generators, electrical loads, and the like.

The principles involved are based upon energy conversion and control theory. To be used as a generator, a vehicle converts its mechanical energy into electrical energy. The speed of the vehicle's alternator/generator is directly proportional to the speed of its engine. (Note that for purposes of the invention, the terms alternator and generator are used synonymously.) The alternator/generator speed is then related to the amount of current or power (if maintaining a constant voltage) that can be supplied to an electrical load. This relationship between the alternator/generator speed and electrical load is provided as a "Speed Versus Load Relationship." The present invention uses a speed versus load relationship (that is a customized calibration for a given system) to determine the appropriate alternator/generator speed for a desired electrical output. A processor, microprocessor, or similar means, or combinations thereof, calculates that desired speed based upon the load. Then, the processor recognizes if the vehicle is stationary and controls an actuator to adjust the throttle accordingly. This invention can also be used for mobile applications wherein the processor recognizes that the vehicle is in motion and takes appropriate actions including, but not limited to: (1) notifying the driver of the state-of-charge (SOC) of the batteries; (2) affecting a control input to the alternator; or (3) affecting the speed ratio between the engine and the alternator. Other optional features and controls exist to the user in the form of system safety interlocks, vehicle monitoring, and power electronics controls.

BACKGROUND OF THE INVENTION

On-board vehicle power is becoming essential for many different types of vehicles including, but not limited to, military vehicles, emergency response vehicles such as fire trucks and ambulances, and work trucks, to name a few. The concept of on-board vehicle power implies that the vehicle itself is being used as an electrical power generator. The electrical power source for an on-board vehicle power system may be provided by the vehicle's alternator and/or a single or multiple generator(s) placed under the hood or elsewhere on or in the vehicle. This on-board vehicle power system eliminates the need for carrying, hauling, or towing a separate motor-generator set into the field when electrical power is needed or required by the user. Additionally, depending upon the type of electrical load to be attached, a power electronics system may be necessary to convert the output of the generator/alternator into a usable form which may be described by characteristics and parameters such as direct current (DC), alternating current (AC), or multi-phase AC at a specific voltage level and frequency. The user may then connect the electrical load to the power electronics system and obtain an appropriate amount of power to be delivered to the electrical load.

For the alternator/generator to supply sufficient power, either the field current of the alternator/generator must be manipulated and/or the speed of the alternator/generator must be changed or modified. The field current is typically modified by a voltage regulator that adjusts the field current to maintain a constant output voltage. The present invention provides for controlling the engine speed for optimal engine performance as well. Typically, adjusting or modifying the field current is not sufficient to accommodate a broad range of electrical loads, resulting in the engine and/or the generator being overloaded and/or potential damage or failure. Therefore, the speed of the engine must be changed or modified to match the electrical load. Some form of a speed versus current (or power) relationship is typically available from the alternator/generator manufacturer. Changing or modifying the speed of the engine therefore requires some type of load sensor, information regarding the speed versus load relationship, an electronic processor, and an actuator that changes or modifies the speed of the engine when necessary. Existing patents do not provide the capability and flexibility of the present invention, which focuses on flexibility with total vehicle integration that can easily be adapted for different types of vehicles and for stationary and mobile applications.

U.S. Pat. No. 7,157,885, an inverter controlled generator set and method for controlling the same, utilizes a constant speed control mode until a set speed is reached and then a constant voltage control mode for speed control, so that the proper output voltage is achieved at the direct current (DC) source. In contrast, the present invention does not solely use a voltage-based speed control system.

U.S. Pat. No. 6,969,922, a transformerless, load adaptive speed controller, controls a variable speed engine/generator set. While the speed is controlled by the load current, it does not accommodate the control and integration of electronics for an on-board vehicle power system.

U.S. Pat. No. 5,311,063, an automatic load speed controller for an engine governor, is utilized for auxiliary or vehicle mounted electrical equipment. This invention is a voltage controller for multiple, selectable preset engine speeds and is not directly responsive to power demands as is the present invention. Additionally, the present invention allows for the entire continuous range of engine speeds from idle to maximum speeds and not certain preset engine speeds.

U.S. Pat. No. 5,216,350, a method and system for controlling an alternator, controls alternator responses based upon system load changes. This patent uses a microprocessor-based voltage regulator which defines a data matrix of system operation coefficients to match the load demand in determining the new field current required. Thus, the alternator output is modified by the field current. The present invention vastly differs from this patent in that, in the present invention, the field current is not the only element modified and total system integration is included and integral to the invention.

There accordingly remains a need in the art for an engine speed controller that provides total system integration and component control for an on-board vehicle power system so that an electrical load can be met tinder both stationary and mobile vehicle applications. The present invention provides such advantages.

SUMMARY OF THE INVENTION

It is an object of the present invention to provide a system and method for controlling the speed of a vehicle engine wherein a speed controller provides total system integration for an on-board vehicle power system. One embodiment comprises a speed controller that is processor or microprocessor-based and that selects the desired speed of the generator based upon the electrical load attached to the system using the generator's speed versus electrical output relationship. This output can be described in terms of power or current. However, when using a voltage regulator to maintain a constant output voltage, a speed versus current relationship can be directly related to a speed versus power (power=voltage× current) relationship. Once the desired engine speed is selected and the vehicle is in a stationary mode, that optimum speed is then implemented by movement of the engine throttle by some electrical, mechanical, or other means. If the vehicle is in a mobile mode, the appropriate action will be taken to account for any added electrical load with minimal intervention by the driver. The objective is to precisely control engine speed for optimal performance. The system of the present invention is unique in that it is specifically applicable to vehicles and is easily adaptable to different types of vehicles. A further advantage and another object of the present invention is to provide a system and method to incorporate total system integration, which includes the speed control task, the supervisory control of attached power electronics, and vehicle and personnel safety features. These and other tasks, control, and safety features may be enabled or disabled depending upon user specifications, providing additional flexibility and adaptability.

The present invention is quite unique and useful in many applications. It is to be understood that changes and variations may be made without departing from the spirit and scope of the invention as defined in the appended claims.

With the foregoing and other objects, features, and advantages of the present invention that will become apparent hereinafter, the nature of the invention may be more clearly understood by reference to the following detailed description of the preferred embodiments of the invention and to the appended claims.

BRIEF DESCRIPTION OF THE DRAWINGS

These drawings accompany the detailed description of the invention and are intended to illustrate further the invention and its advantages.

DETAILED DESCRIPTION OF THE INVENTION

Figure 1:
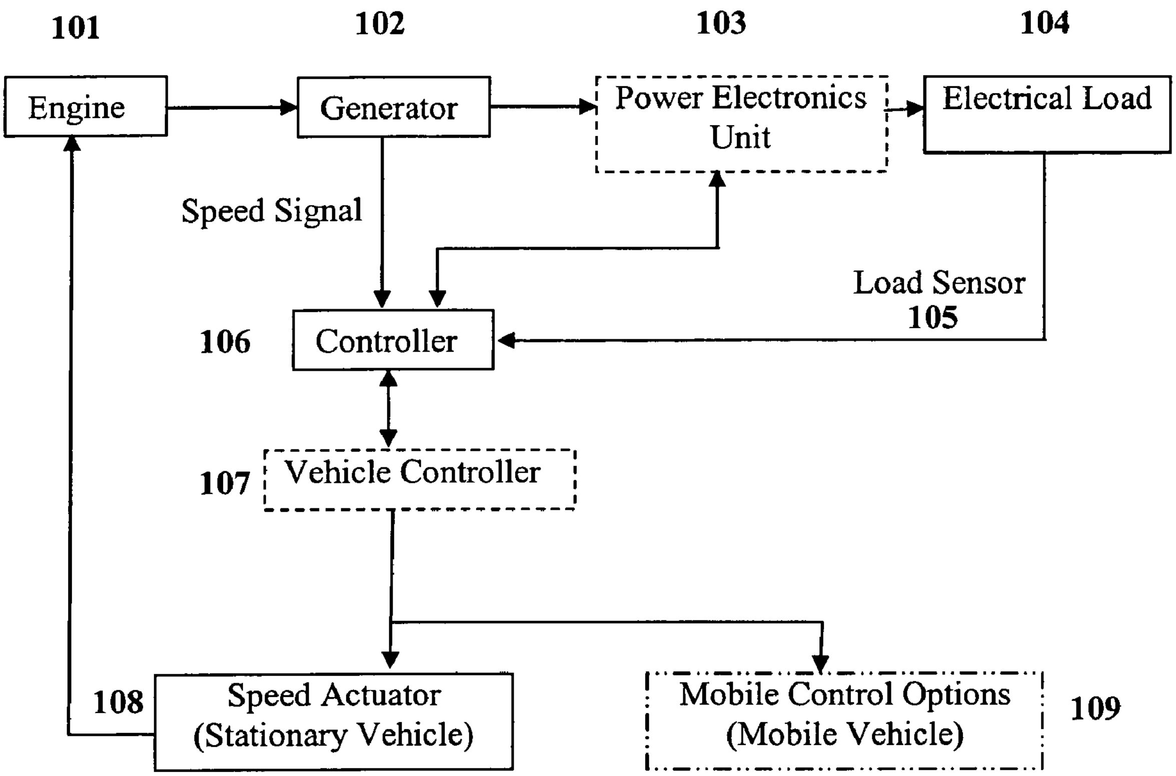
FIG. 1 is a functional block diagram showing the basic speed controller and key elements.

The present invention is directed to a method and system for controlling the speed of a vehicle engine to accommodate a variable electrical load receiving power from an alternator/generator driven by the engine. (The terms alternator and generator are to be understood as synonymous for the present invention.) The speed controller of the present invention provides total system integration for an on-board vehicle power system. The present invention therefore is applicable for conditions in which a vehicle is being utilized as an electrical power generator. One of the main components of the present invention is a speed control system that adjusts the speed of a vehicle's engine for the desired electrical output. The system may also work in conjunction with a voltage regulator. Generally, to obtain the desired electrical output, the alternator/generator must be rotating at a high enough rotational speed to supply the electrical load. If that does not occur, the vehicle's battery or batteries may be quickly drained while attempting to meet the output. Further, if the alternator is not rotating fast enough to meet the load, the generator and/or the engine may suffer possible adverse effects, including overheating, wear, belt slippage, and/or failure. Conversely, if the alternator is rotating too fast (faster than that needed to meet the load), fuel may likely be wasted. Therefore, the engine speed control system of the present invention provides substantial rewards in fuel economy, battery maintenance, and engine and generator health by operating the engine at an optimal speed.

It will be understood by those skilled in the art that the present invention is not limited in its application to the details of the arrangements described herein since it is capable of other embodiments and modifications. Moreover, the terminology used herein is for the purpose of such description and not of limitation.

In addition to the engine speed control aspect, the present invention supplies basic control and an interface with the electrical load components, such as a power electronics unit, to provide alternating current (AC) or direct current (DC) electrical power. Safety interlocks and vehicle monitoring are also optional features with the present invention that protect the vehicle and operational personnel. The actual speed control and the power electronics and vehicle monitoring/control of the present invention therefore allow for a total system integration package. Moreover, the total control package of the present invention is easily adaptable to any type of vehicle. In order to adapt to different types of vehicles, variables for the system may be set up as "calibration values" for the processor, microprocessor, or processing means program. As a result, a setup file can be created to customize the product for a particular consumer. In such a setup file, certain values can be turned on and/or off or numerically changed. These values include, but are not limited to, values such as engine to generator pulley size, load sensor calibrations, and the like.

For an on-board vehicle power system, a speed control system is essential to ensure that the generator is spinning fast enough to supply the electrical load. FIG. 1 shows a general block diagram that describes the key elements of the speed control system of the present invention. The engine 101 can be an internal combustion engine, either spark or compression ignition, or other constructions such as a turbine or sterling engine. The engine speed is crucial to this system because it actually determines the speed of the electric power generator 102. Some form or means of coupling, or combinations thereof, such as pulleys, belts, gears, and the like, links the engine 101 with the generator 102 of this system. As a result, the speed of the generator 102 has a direct relationship with the speed of the engine 101 through a linkage ratio. The speed of the engine 101 is therefore manipulated in this scheme by the speed actuator 108 for stationary applications. For mobile applications, several mobile control options 109 exist including, but not limited to, notifying the driver of the state-of-charge (SOC) of the batteries so that appropriate action(s) can be taken, affecting a control input to the alternator, or affecting the speed ratio between the engine 101 and the alternator/generator 102.

The generator 102 provides electrical power for any auxiliary or onboard equipment, as well as for any vehicle system loads. This generator 102 can be composed of an existing or upgraded alternator in a vehicle. Another option or embodiment for the generator 102 is at least one additional generator mounted under the vehicle hood and/or in or on another portion of the vehicle. The existing generator 102 in that case would assume its normal vehicle function and the new generator(s) would supply all other electrical power needed. The electrical power source could also be an integrated starter-alternator that would utilize the machine for both starting the vehicle and for generating electrical power. The speed of the alternator/generator 102 is directly linked to the speed of the engine 101. The output of the generator 102 could be either AC (alternating current) or DC (direct current).

Regardless of the type of generator used, the speed of the generator 102 comprises an input to the controller 106. A speed signal is provided to the controller 106 that is proportional to the rotational speed of the generator 102. The controller 106 then deduces or calculates the specific speed (e.g., revolution per minute ("rpm") value(s)). For example, signals could be derived from a tachometer available on the vehicle or a signal from the alternator.

The electrical load 104 is powered by the generator 102. The electrical load 104 may be either an AC or a DC load. A power electronics unit 103 is usually involved for an AC load. Similarly, power electronics may be used to alter the voltage level of a DC load. Therefore, due to the fact that a power electronics unit is optional for this system, it is shown in FIG. 1 as a dashed box before the electrical load 104. For an on-board vehicle power system, the electrical load 104 typically refers to a load in units of kilowatts. For the speed controller, at least one load sensor 105 is used to detect the demanded power level. For a regulated voltage source, at least one current sensor measures current in several possible ways including, but not limited to, utilizing a Hall-effect current sensor, a current shunt, a current transformer, or the like, whereby the current is directly proportional to power. The type(s) of sensor(s) and related information can be entered in the setup file, such that the controller 106 can calculate the given load. The electrical load 104 can be transported by the vehicle or by a separate vehicle or it may be stationary.

Figure 2:
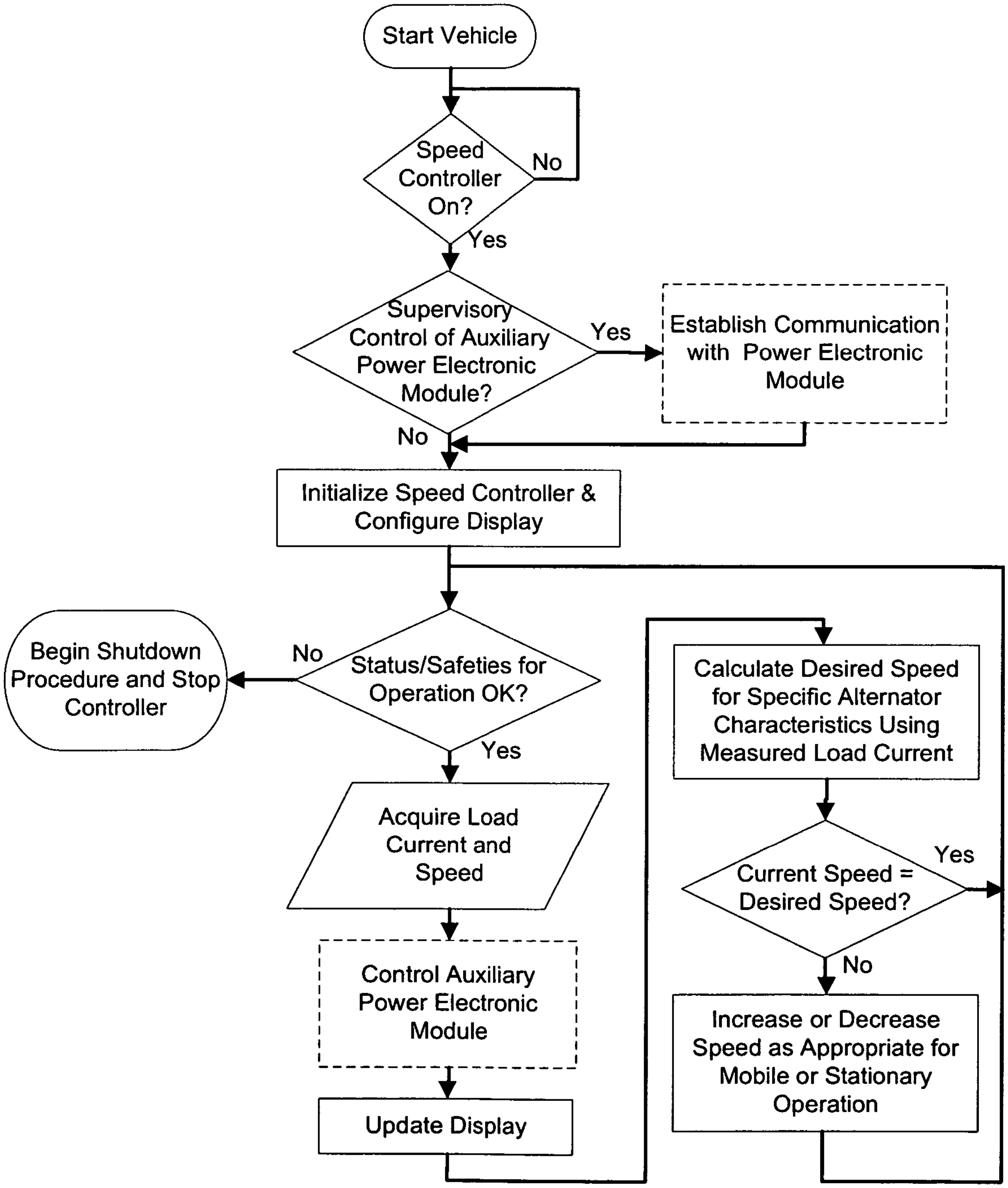
FIG. 2 is a flowchart showing the basic speed controller functionality.

The electronic controller 106 is the heart of the engine speed control system. The controller 106 uses a processor, microprocessor, or similar device, or other processing means or combinations thereof, to determine the appropriate engine speed based on the electrical load 104. As shown in FIG. 1, the inputs to the system are signals related to the electrical load 104 (the load sensor 105) and the generator speed (the speed signal). Many other parameters or values exist that can be directly input to or derived from the controller 106 which are described herein. For instance, if a power electronics unit 103 is used, there will be communication between the controller 106 and the power electronics unit 103. A flowchart describing the basic operation of the controller 106 is shown in FIG. 2.

Figure 3:
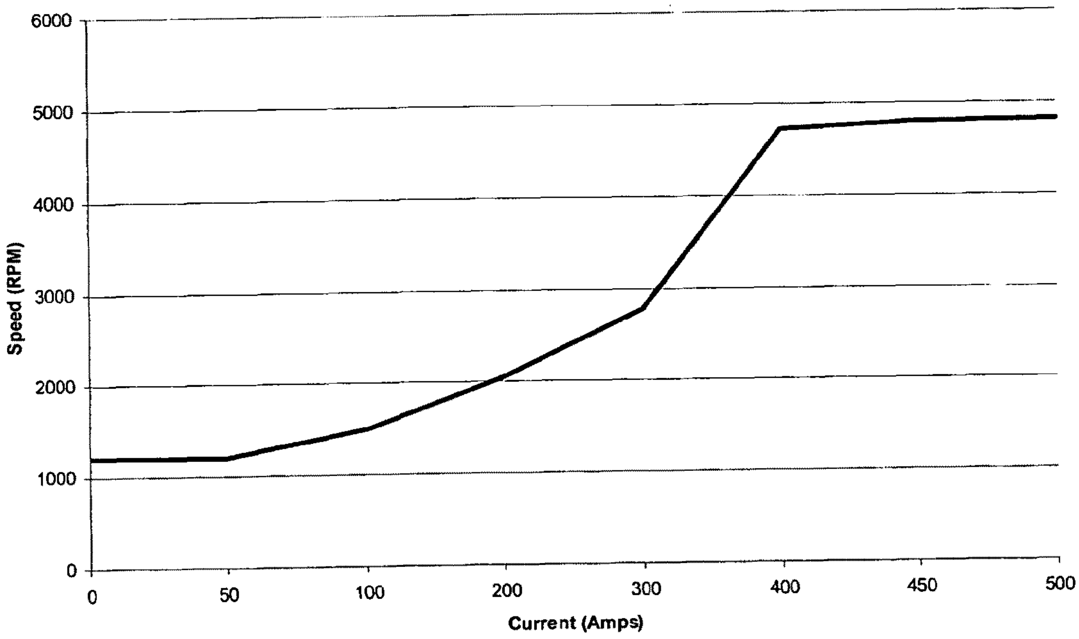
FIG. 3 is a graphical illustration of an example of a speed versus current relationship (speed versus power relationship at a constant voltage) for an alternator.
Figure 4:
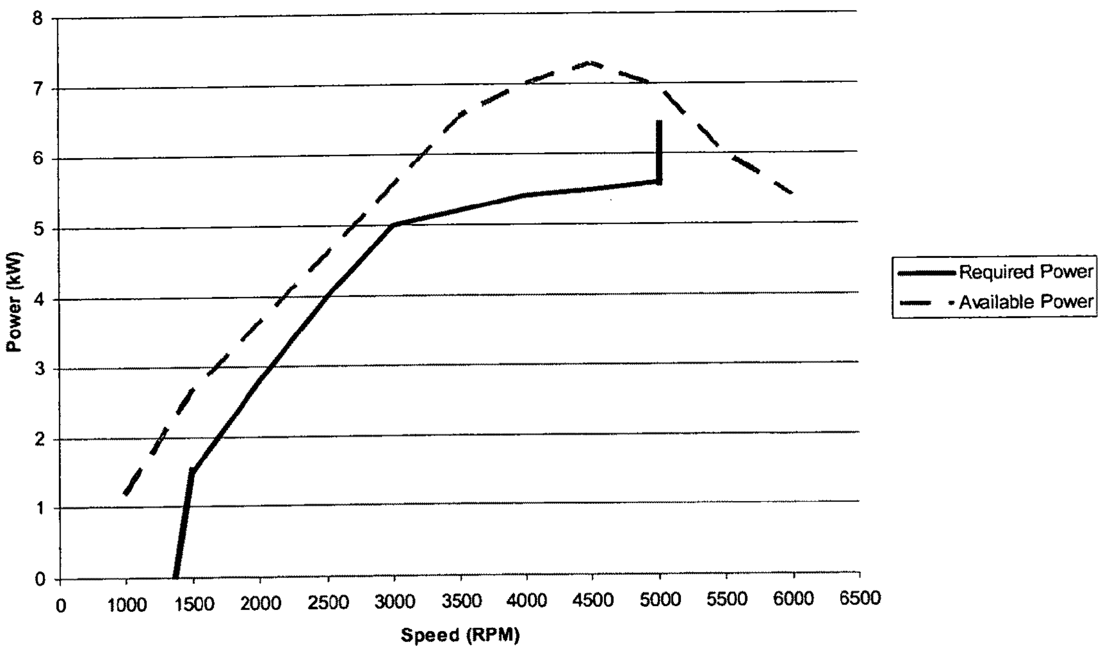
FIG. 4 is a graphical illustration of an example of the required (desired) power (within available power limits) on a power versus speed relationship for an engine.
Figure 5:
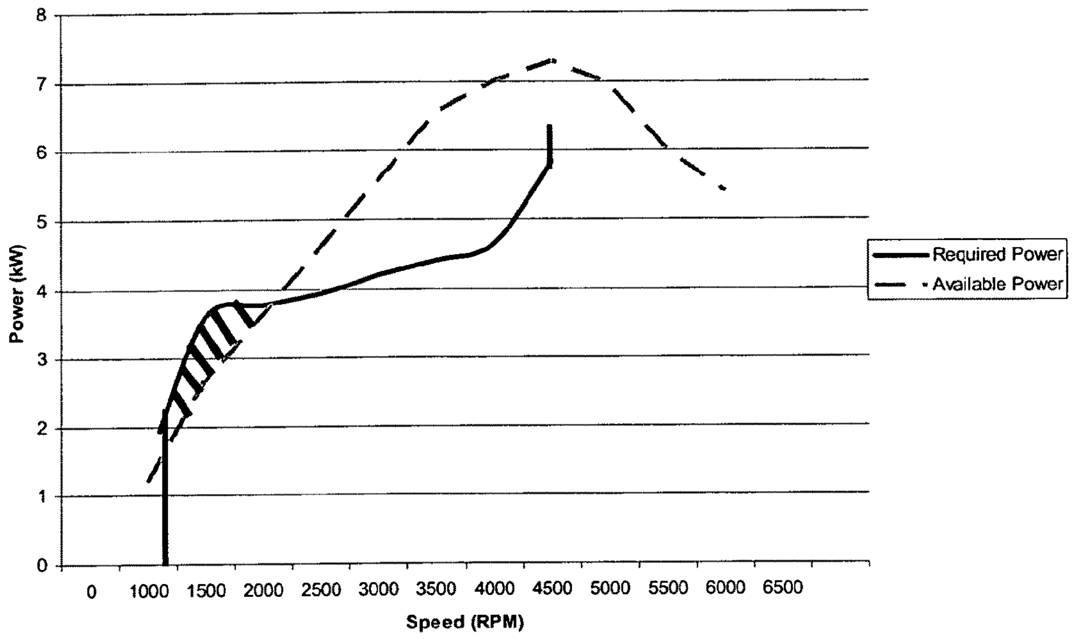
FIG. 5 is a graphical illustration of an example of the required power (that exceeds available power) on a power versus speed relationship.

Once the controller 106 calculates the current engine speed and load, the controller 106 then determines the appropriate operating speed for the given conditions. This appropriate operating speed calculation is based upon the generator's speed versus load relationship. This relationship is specific to the generator 102 and indicates the speed needed for a particular load. This relationship information is also a calibration value that can be easily changed or modified for different generators. A safety margin can also be added as a conservative calibration value, thereby cushioning the desired engine speed to account for items such as elevated temperatures for hot ambient conditions or heavy loading. FIG. 3 shows one example of an arbitrary speed versus current relationship for an alternator (where power is at a constant voltage). Power can be calculated from this speed versus current relationship if a voltage regulator is used or if the voltage is sensed by the controller 106. FIG. 4 depicts a desired power relationship (within available power limits) along with a speed versus available power relationship for an engine. The desired power level is likewise measured by the load sensor 105 and the desired power level's relationship to speed can be derived easily from the current relationship (as shown in FIG. 3) when the voltage is maintained at a constant level. FIG. 4 shows the available power from a typical internal combustion engine of a vehicle as a dashed line. This available power can therefore be found for different types of vehicles and engines. As long as the power level required is less than (below) the available power for a given engine speed, the generator will be operated in a safe operating region, as shown in FIG. 4. However, if the power level required is greater than (above) the available power for a given engine speed, the engine and/or other equipment may become damaged or fail. FIG. 5 illustrates the need for proper engine speed controls, since at certain speeds the required power is greater than (exceeds) the available power (depicted by the cross-hatched region in the figure). In this cross-hatched region, the alternator/generator would not be able to supply the load and problems would ensue without the appropriate speed control system.

Once the optimum or desired engine speed is calculated, the processor then determines the error between the actual generator speed and the desired generator speed. If the error is greater than some predefined value (a calibration input), the controller 106 provides the appropriate signal to the speed actuator 108 to adjust and maintain the speed within the controller's desired limit for stationary applications or engages the mobile control options 109 for mobile applications. FIG. 1 shows that there are two output modes from the controller: one for the speed actuator 108 for stationary use, and one for the mobile control options 109 for mobile use. The dotted and dashed box indicating the mobile control options 109 in FIG. 1 indicates that this is an either/or case, so that either the stationary use or the mobile use is active (but never both at the same time). The controller 106 continuously checks the actual speed with the desired speed to ensure that the appropriate speed is being maintained. If the error signal between the actual speed and the desired speed is greater than a certain value, the speed of the engine 101 must be changed which likewise results in a change to the speed of the generator 102 if the system is stationary. This function is achieved by the speed actuator 108 (as shown in FIG. 1), which is comprised of various possible means of adjusting the engine throttle, typically through an electrical, mechanical, or other type of connection, or combinations thereof, to the throttle. One such embodiment comprises a mechanical means composed of a stepper motor and electromagnet assembly that pulls or releases the throttle cable. The pull or release of the throttle cable depends upon the signal sent to the stepper motor by the controller 106. This signal results in movement or rotational change of the stepper motor in a certain direction by a certain amount. The amount of movement or rotational change depends upon the degree of the error (between the actual speed and desired speed) determined to exist. Another such embodiment comprises the use of the optional vehicle controller 107 and control of the engine speed by electrical means. In that embodiment, the controller 106 outputs a signal dependent on the error value to either increase or decrease the speed of the engine 101 by a certain amount using various electrical means, including the vehicle electronics. If the system is being used in mobile operation, careful consideration must be employed. The engine speed control cannot be modified independent of the driver. Therefore, the user can decide the best option for this situation using the mobile control options 109. One option is to alert the driver of the state-of-charge (SOC) of the batteries. When more load is added and the generator 102 is not spinning fast enough to supply that load, the batteries will begin to supplement power to supply the load. At this point, the batteries may be drained quickly and, as a result, the driver must be alerted of the decreasing SOC so that either engine speed can be increased and/or some of the load can be shed. Another option is to modify a control input to the generator 102. However, there are limits such as saturation that can occur and adjusting an input control to the generator 102 (e.g. field current) will likely not supply enough power to meet the demand. At that point, the batteries will begin to supplement power to the load. A final option is to affect the speed ratio between the engine 101 and the generator 102, so that the generator speed will increase with minimal speed increase on the engine 101. Obviously, this must be carefully controlled by hardware such as variable speed pulleys or a variable speed gear box.

As shown in FIG. 1, a second dashed box indicates an electronic vehicle controller 107 (such as an electronic control module) which is an option based on the chosen vehicle. The vehicle controller 107 refers to the smart controller in newer vehicles which may also include "drive by wire" capabilities. If this component exists, the controller 106 of the present invention can easily be set up to communicate with the vehicle controller 107 (through a controller area network (CAN) or other means) in terms of basic data or information exchange, as well as providing or accepting commands to increase or decrease the engine speed.

In the present invention, calibration values comprise a unique feature of the system. Calibration values allow certain operational parameters to be easily changed or modified in a setup file. The parameters are built into the program for the controller 106 as calibration values, so that these values (parameters) can be customized for a particular system. This customization ability results in the system being extremely adaptable to different types of vehicles, different types of generators, different electrical loads, and the like. All calibration variables can be listed in a spreadsheet format and a technician can utilize the spreadsheet and make any necessary changes to default values. One example of a calibration value that can be modified is the linkage relationship between the engine 101 and the generator 102 (e.g., pulley ratios). Another example of the system's flexibility is the capability to enter the speed/load relationship for the generator 102, the load sensor 105 information, and the like. Calibration values can also be enabled or disabled in the customized setup file. For example, if the controller 106 is used to monitor any attached power electronics, system status features for the power electronics can be set up to be enabled or disabled (i.e., error messages).

Additionally, system operational safety features for the vehicle and for personnel can also be easily implemented in the controller 106, such as detection of whether the vehicle is in neutral, emergency brake position, vehicle monitors, and the like. Based upon these features, the controller 106 can output messages to a system status display. The particular safety features necessary for a given application can be selected and customized in a setup file.

Figure 6:
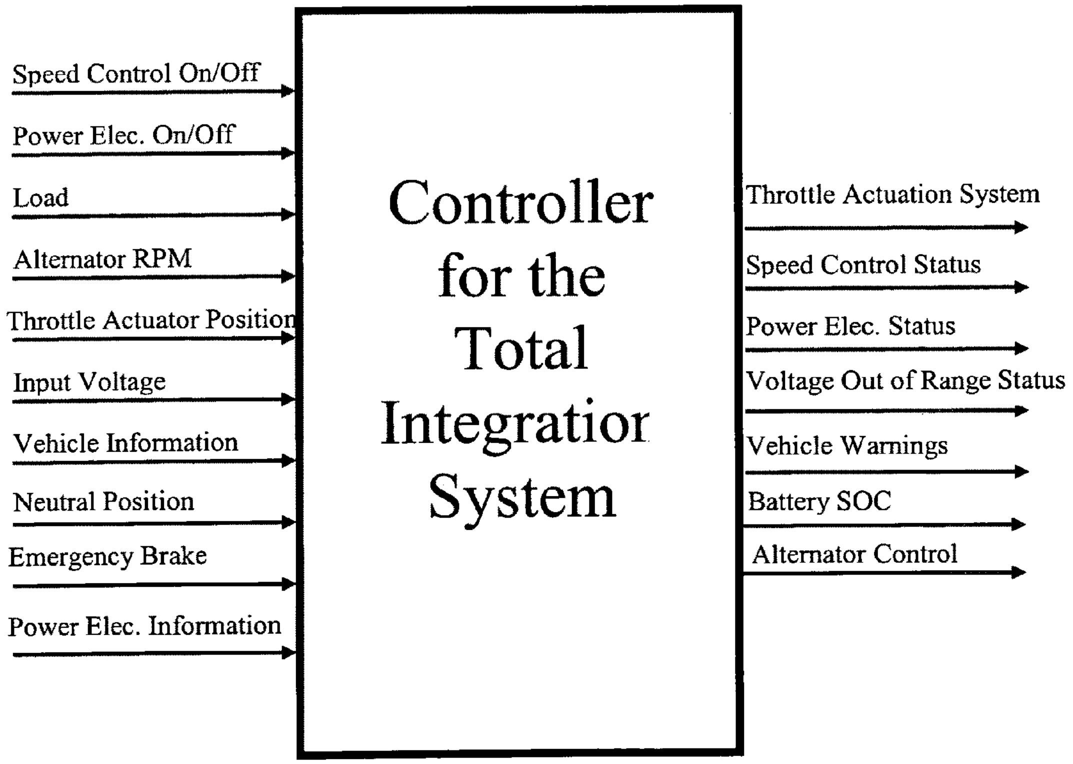
FIG. 6 is a diagram of an example system depicting some possible inputs and outputs of the controller utilizing some aspects of total system integration.

FIG. 6 shows some of the multiple inputs and outputs of a controller designed for some aspects of the total integration system. FIG. 6 shows inputs/outputs for the speed control, inputs/outputs for the optional power electronics, and inputs/outputs for the vehicle. These inputs/outputs represent only certain selected inputs and outputs of the many possibilities. A given system can have more or less inputs depending upon the calibration values involved. The inputs for this example include, but are not limited to, power switches for the speed controller and the associated power electronics, load, alternator/generator RPM, throttle actuator position, input voltage for the controller, vehicle information, gear position(s), safety interlocks, and power electronics system information. Based upon the logic built into the controller, system feature outputs may include, but are not limited to, the following: the speed control actuation driver and optional outputs such as output status displays for speed control, power electronics, voltage warnings, vehicle warnings, battery SOC, and alternator control.

Figure 7:
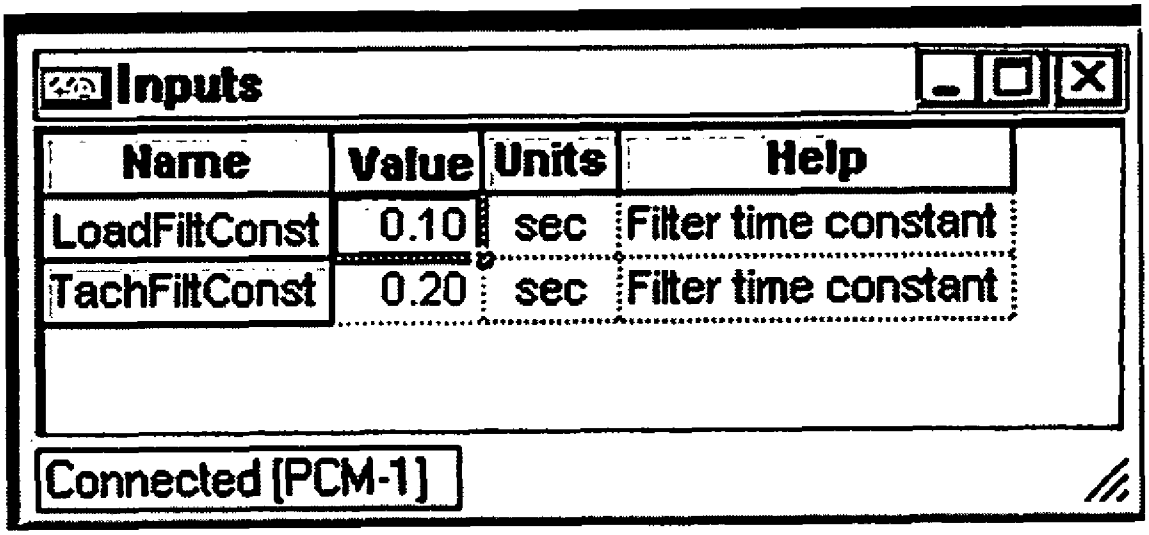
FIG. 7 is an excerpt from a spreadsheet with example changeable calibration values for the system.

FIG. 7 shows an excerpt of a portion of a spreadsheet with some of the calibration values for the system. This particular example requests filter time constants. These parameters are for software filters built into the system to reduce any signal noise that may occur. Signal noise may lead to erroneous raw data values; therefore, such noise needs to be eliminated or minimized as much as possible. For example, the load filter constant is the time constant needed for a software filter on the load measurement. By selecting the appropriate value in the built-in filter model, noise would be eliminated or reduced on the load sensor signal within the processor, microprocessor, or processing means. As shown in FIG. 7, the value can be changed from 0.1 seconds (the default value) to the appropriate value for a given system. This value change can occur in the setup file without requiring the software program to be rebuilt. The calibration capability is therefore a major advantage of the present invention.

The engine speed controller of the present invention truly provides total system integration for multiple on-board vehicle power applications. This disclosure has for the first time described and fully characterized an engine speed controller that can be utilized when a vehicle is used for electrical power generation and distribution whereby all components are located within the vehicle to provided electrical power to meet an electrical load. Moreover, the invention is useful in various conditions, including both stationary and mobile vehicle applications.

The above is a detailed description of particular embodiments of the present invention. All embodiments disclosed and claimed herein can be easily executed in light of this disclosure. While various embodiments of the present invention have been described above, it should be understood that they have been presented by way of representative example and not limitation. Those of ordinary skill in the relevant art(s), in light of the present disclosure, should recognize and understand that a wide variety of various and obvious changes, alternatives, variations, and modifications in form and detail of the embodiments disclosed herein can be selected and made therein without departing from the true scope and spirit of the present invention. After reading the above description, it will be apparent to those skilled in the relevant art(s) how to implement the invention in alternative embodiments. Thus, the present invention should not be limited by any of the above-described exemplary embodiments. The invention is described both generically and regarding specific embodiments, while the full scope of the invention is set out in the claims and their equivalents that follow. The disclosure and description presented further explain the invention and are not to be interpreted or inferred as limiting thereof. The claims and specification should not be construed to unduly narrow the complete scope of protection to which the present invention is entitled. The disclosure and appended claims are intended to cover all modifications that may fall within the scope of the claims.

Moreover, the present invention is complex in nature and is generally best practiced by empirically determining the appropriate values of the operating parameters, or by conducting computer simulations, to arrive at best design for a given application. Accordingly, all suitable modifications, combinations, and equivalents should be considered as falling within the spirit and scope of the invention. It should also be understood that the drawings are presented for example purposes only.

The purpose of the abstract of the disclosure is to enable the U.S. Patent and Trademark Office, the public in general, and particularly the scientists, engineers, and practitioners in the art who are unfamiliar with patent or legal terms or phraseology, to efficiently determine from a cursory inspection the nature and essence of the technical disclosure of the application. The abstract of the disclosure is therefore not intended in any way to be limiting as to the scope of the present invention.

What is claimed is:

1. A system for controlling the speed of an engine in a vehicle in which electrical power is produced by a generator driven by the engine and where the electric power is delivered to an electrical load such that the engine speed is optimized based upon the characteristics of the generator and the magnitude of the electrical load, the system comprising:

input sensors for measuring the engine speed and the power delivered to the electrical load; and a speed controller having an output for adjusting the engine speed instantaneously to a desired speed that the speed controller determines based upon the input sensors and the specific characteristics of the generator;

at least one generator providing a speed signal output and wherein the generator is mechanically coupled to and driven by the vehicle engine and provides an AC or DC electrical output to an AC or DC electrical load;

an optional power electronics unit driven by the at least one generator and connected between the generator and the electrical load for conditioning power if necessary, wherein the power electronics unit output supplies an AC or DC electrical load, transforms voltage from DC to AC or AC to DC, modifies the generator output voltage based on the electrical load requirements, or a combination thereof;

an electrical load sensor communicatively coupled to the speed controller and the AC or DC electrical load for determining a sensed AC or DC electrical load on the generator;

a controller communicatively coupled to the power electronics unit and driven by inputs from the at least one speed signal and the electrical load sensor and having at least one output comprising the calculated desired speed of the vehicle engine and the generator, for determining the rotational speed of the generator using at least one speed signal from at least one system component having a rotational speed that is proportional to the speed of the generator and for specifying the relationship between the vehicle engine speed and the AC or DC electrical load on the generator, wherein the speed controller maintains the desired speed of the vehicle engine based on the actual speed, the type of generator, and the AC or DC electrical load on the generator and utilizes the sensed electrical load to determine the desired engine speed based on the characteristics of the generator and wherein the desired engine speed changes in time with a time-varying electrical load and the speed controller increases or decreases the speed of the engine and generator as the electrical load increases or decreases;

an optional vehicle controller communicatively coupled to the speed controller of the system for electrically controlling the speed of the vehicle engine and the speed of the generator, wherein the vehicle controller provides engine speed signals, electrical load signals, or a combination thereof, to the speed controller;

a throttling means for adjusting the speed of the vehicle engine, whereby the speed of the engine and generator are adjusted to minimize the speed differential between the desired speed and the actual speed of the generator; and a speed actuator driven by the speed controller or the vehicle controller for adjusting the throttling means and the speed of the vehicle engine and of the generator.

2. The system of claim 1, wherein the speed controller can be customized for adapting the system to different vehicle engines.

3. The system of claim 1, wherein the at least one generator provides an AC or DC electrical output to at least one vehicle load and at least one non-vehicle load.

4. The system of claim 1, wherein the controller is configured to:

receive a plurality of inputs related to operation of the engine and the vehicle and related to the status of system component values, determine a desired generator speed and engine speed based on the inputs received, determine whether the desired generator speed and engine speed are within a desired range and whether the vehicle is stationary or mobile, and control the engine at the desired engine speed.

5. The system of claim 1, wherein the controller is configured to:

provide one or more outputs related to the operation of the engine and the vehicle and related to the control and status of system component values, provide one or more outputs to a system status display, and control the engine at the desired engine speed based on the electrical load and on whether the vehicle is stationary or mobile.

6. The system of claim 1, wherein the controller is calibratable and maintains the desired speed of the vehicle engine based on one or more of the parameters of engine type, generator type, required power, ambient temperature, and electrical load value.

7. The system of claim 1, wherein the controller continuously maintains the desired speed of the at least one generator and is communicatively coupled to the speed actuator and controls the speed actuator and the engine speed.

8. The system of claim 1, wherein the system and vehicle engine are stationary.

9. The system of claim 8, wherein the speed actuator further comprises at least one mobile control option feature selected from the group consisting of adjusting the battery state of charge, adjusting at least one control input to the generator, adjusting the speed ratio between the engine and the at least one generator, and a combination of two or more thereof.

10. The system of claim 1, wherein the controller can be customized for modifying and calibrating system input values, operational parameters, and safety features and for providing operational output values.

11. The system of claim 1, wherein the controller can display the status of system input values, operational parameters, and safety features and can enable or disable at least one portion of the system.

12. The system of claim 11, wherein the controller can adapt the system to various vehicle types.

13. The system of claim 1, wherein the controller is communicatively integral to the vehicle controller.

* * * * *